3,167,558
17-DESMETHOXY-17α-ETHYL RESERPINE
Ivan Ernest and Miroslav Protiva, Prague, Czechoslovakia, assignors to SPOFA, Sdružení podniků pro zdravotnickou výrobu, Prague, Czechoslovakia
No Drawing. Filed Nov. 19, 1962, Ser. No. 238,800
Claims priority, application Czechoslovakia, Nov. 20, 1961, 6,849/61
1 Claim. (Cl. 260—287)

The present invention relates to the preparation of new racemic 17-desmethoxy-17α-ethyl reserpine of Formula I. This substance is a new type of a reserpine analogue having no sedative and staractic effect, but a high hypotensive activity on account of which it can be used in therapy. The new substance is differentiated from the alkaloid reserpine in that in the position 17 it is substituted by an ethyl group in place of the methoxyl group, otherwise keeping the identical steric configuration in all assymmetry centres. Thus, it can be designated as an isostere of reserpine.

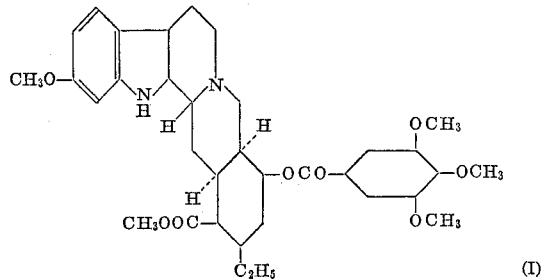

(I)

The essence of the method of the present invention lies in the totally synthetic process starting from the racemic lactone of the 2α-ethyl-3β,5β-epoxy-8β-hydroxy-1,2,3,4,5-8,9α,10α-octahydro-1β-naphthoic acid (II). This lactone is treated by action of N-bromosuccinic imide in a mixture of diluted sulfuric acid and tert. butyl alcohol at 80°, i.e. virtually by addition of hypobromic acid. There results a new crystalline (1,8)-lactone of the 2α-ethyl-3β,5β-epoxy-6α-bromo-7β,8β-dihydroxy-9α,10α - decalin-1β-carboxylic acid (III), which either can be isolated in pure state, or without being isolated oxidized at 20–30° directly with chromium trioxide in acetic acid to the corresponding racemic bromoketone, i.e. the lactone of 2α-ethyl-3β,5β-epoxy-6α-bromo-7-oxo-8β - hydroxy - 9α,10α-decaline-1β-carboxylic acid (IV). The same product can be prepared by oxidation of the pure and isolated bromohydrine (III). The next step is the reaction of bromoketone (IV) with zinc in acetic ahydride. Under very mild conditions this results in splitting off of the bromide atom, to reduction of the opening of the lactone and epoxide ring, and to acetylation, so that the acetoxy-acid (V) is formed, i.e. racemic 2α-ethyl-3β-acetoxy-7-oxo-1,2,3,4,7,8,9α,10α-octahydro-1β-naphthoic acid. In continuing the totally synthetic process this acid is converted by esterification to the methyl ester (VI). For this purpose it is especially preferable to use diazomethane or dimethyl sulfate in sodium bicarbonate solution, as described in the example. There is further performed hydroxylation of the double bond in the position 5,6, for which purpose barium chlorate in the presence of osmium tetroxide is used to advantage. The operation is carried out at room temperature in aqueous solution. There is obtained crystalline cis-diol (VII), i.e. racemic methyl ester of the 2α-ethyl-3β-acetoxy-5α,6α-dihydroxy-7-oxo-9α,10α-decaline-1β-carboxylic acid. By splitting with aid of periodic acid and subsequent esterification with diazomethane, raw racemic methyl ester of 2β-carbomethoxy - 3α-ethyl-4β-acetoxy-6β-formylcyclohexyl-1β-acetic acid (VIII), is formed, which is not isolated, but directly in the solution is condensed with 6-methoxytryptamine. Likewise, the resulting Schiff's base is not isolated, but directly reduced with sodium borohydride in absol. methanolic solution. At the same time the lactam ring becomes closed and desacetylation take place, so that DL-methyl-2,3-seco-3-oxo-17-desmethoxy-17α-ethyl reserpate (IX) is directly formed. This compound is isolated in pure state in the form of a crystalline substance, and is further converted by action of 3,4,5-trimethoxybenzoyl chloride in anhydrous pyridine to the trimethoxybenzoate (X), which can be designated as the DL-2,3-seco-3-oxo-17-desmethoxy - 17α - ethyl reserpine. This substance is likewise isolated in crystalline form. There is further performed cyclization by action of boiling phosphorus oxychloride, and the quaternary salt thus formed is converted by aid of a sodium perchlorate solution to the orange yellow and very slightly soluble perchlorate of DL-3(4)-dehydro-17-desmethoxy-17α-ethyl reserpine (XI). The final step of the synthesis is reduction of the latter substance with zinc in acid solution. There is thus formed the desired DL-17-desmethoxy-17α-ethyl-reserpine (I) in mixture with about 25% of the corresponding 3-epimer. The mixture is separated preferably by chromatography on alumina, with the less polar and undesired 3-isomer being eluated first. The final product (I) is a colourless crystalline substance with M.P. 140–143° C., very slightly soluble in water. The final substance, just as all the intermediate products, were characterized by analysis and infra-red spectra, confirming the structure attributed to them herein.

The above described synthesis is illustrated by the following formulae:

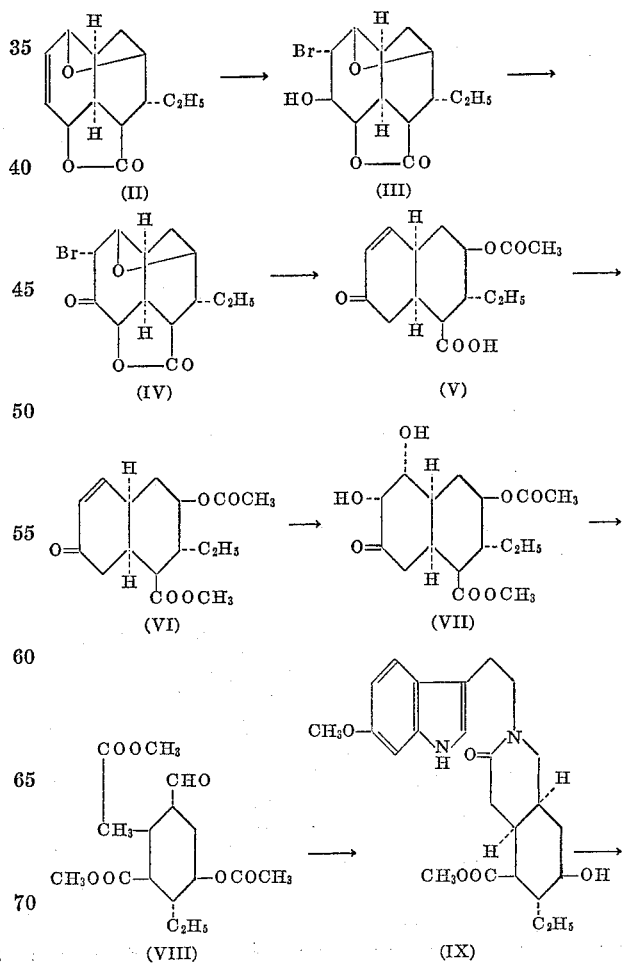

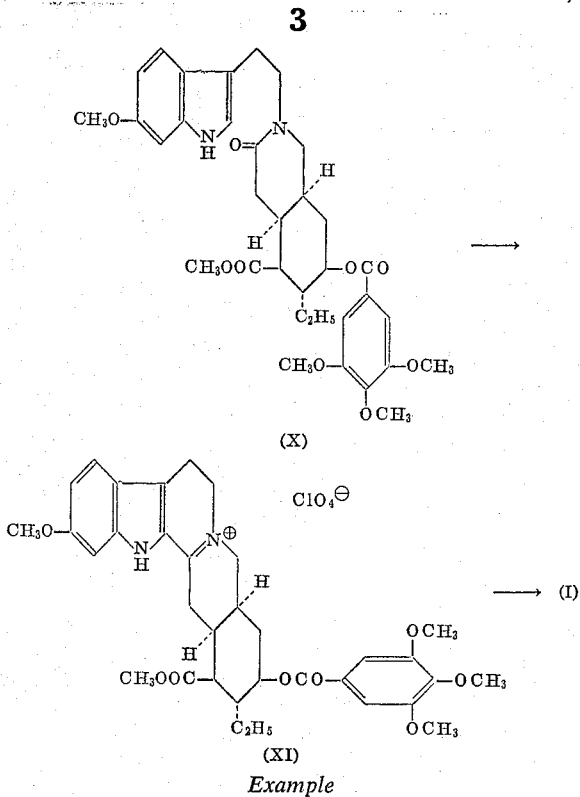

*Example*

A total of 2.4 g. of N-bromosuccinic imide is added in several portions to an agitated solution of 2.87 g. lactone (II) in 26 ml. water, 5.2 ml. N $H_2SO_4$ and 15 ml. tert. butyl alcohol at 80° C. After 30 min. stirring the mixture is concentrated at reduced pressure, the residue extracted several times with methylene chloride, the solution obtained dried with magnesium sulfate, and evaporated. There is obtained 4.5 g. of crude residue, which either can be directly in the same state used for oxidation, or which by mixing with acetone can be crystallized. In this way and by subsequent recrystallization from acetone 1.45 g. of analytically pure "bromohydrine" (III) is obtained, having M.P. 167–168° C.

The crude bromhydrine (III) (the evaporation residue), prepared of 46.7 g. lactone (II), is dissolved in 100 ml. acetic acid, under agitation a solution of 36 g. chromium trioxide in 25 ml. water and 50 ml. acetic acid is added, and the mixture allowed to stand for 3 hours with occasional external cooling under running water; whereafter it is diluted with 250 ml. water. An oily product separates out, which crystallizes on friction. By sucking off, boiling with a slight amount of acetone and cooling down the suspension, 25.5 g. of the desired "bromoketone" (IV) is obtained, which for the purpose of analysis is recrystallized from a mixture of acetone and ether; M.P. 132–133° C. (decomp.).

29.3 g. of bromoketone (IV) is dissolved at 40° C. in 600 ml. acetic anhydride, and under stirring 30 g. zinc is added. The mixture is then externally cooled with cold water; nevertheless, the temperature spontaneously rises to 60° C. After 7 min. stirring the mixture is filtered, the zinc washed on the filter by a little acetic anhydride, and the filtrate evaporated in vacuo. The residue is dissolved in a mixture of 60 ml. acetone and 60 ml. water, and the mixture left standing overnight. Thereupon an additional 300 ml. water is added and the solution extracted with chloroform. The extract obtained is dried with sodium sulfate and evaporated under reduced pressure. On mixing with 100 ml. ether the residue crystallizes. By suction filtration 20.5 g. of crystalline "acetoxyacid" (V) is obtained, which for the analysis is recrystallized from an acetone-ether mixture; M.P. 173–175° C.

To a solution of 15.3 g. of the "acetoxyacid" (V) in 62 ml. acetone and 62 ml. of 8% sodium bicarbonate solution is added under stirring, 6.0 ml. freshly distilled dimethyl sulfate. The mixture is stirred for 2.5 hours at room temperature, and then 1.8 ml. dimethyl sulfate and 18 ml. of 8% sodium bicarbonate solution are again added. Stirring is then continued for 1 hour, and addition of the given quantities of both latter substances is repeated. After an additional 1 hour stirring the mixture is allowed to stand at room temperature overnight. By suction filtration 15.1 g. of crystalline product is obtained, which on recrystallization from aqueous acetone has M.P. 101.5–103.5° C. According to the analysis, the substance is the "methylester of acetoxyacid" (VI).

A mixture of 20 ml. of 1.1% osmium tetroxide solution, 20 ml. water, 0.36 g. barium chlorate, and 2.0 g. of the above-said "methylester" (VI), finely ground, is shaken for 6 hours at room temperature. Thereupon an additional 0.80 g. barium chlorate is added, and shaking continued for another 18 hours. By suction filtration 1.9 g. of crude product, i.e. diole (VII), is obtained, which on recrystallization from methanol has M.P. 173.5–175° C.

To a solution of 3.2 g. of diole (VII) in 500 ml. water and 100 ml. dioxane 9.2 g. periodic acid is added and the solution stirred for 25 min. at room temperature. It is then extracted by shaking with 600 ml. ethyl acetate, the organic solution washed twice with saturated salt solution, dried with sodium sulfate, and evaporated. The colourless syrupy residue is dissolved without delay in 250 ml. ether and esterified with 50 ml. of a 1.8% etheric solution of diazomethane by 4 minutes standing at 0° C. The excess diazomethane together with ether are then distilled off, the oily residue (crude dimethyl ester (VIII)) is dissolved in 20 ml. benzene (thiophene free), and to the solution a warm solution (35–40° C.) of 2.0 g. 6-methoxytryptamine in 140 ml. additional benzene is added. After 7 min. standing of the mixture the benzene is distilled off in nitrogen stream at reduced pressure, the evaporation residue dissolved in 100 ml. absolute methanol, and the solution reduced by addition of 1.0 g. sodium borohydride. The mixture is left standing for 30 min. at room temperature, then boiled for 45 min. under reflux, and thereupon allowed to stand overnight. It is concentrated in nitrogen atmosphere to a small volume, diluted with 500 ml. ethyl acetate, and the solution washed 3 times with 80 ml. 2N HCl and 80 ml. saturated solution of sodium chloride. It is dried with sodium sulfate and evaporated. The syrupy residue (4.2 g.) crystallizes on addition of ether and methanol. There is obtained 2.4 g. of satisfactorily pure "hydroxylactam" (IX), which on recrystallization from chloroform-methanol-ether melts at 216–216.5° C.

The mixture of 3.95 g. "hydroxylactam" (IX), 3.5 g. of 3,4,5-trimethoxybenzoyl chloride and 50 ml. absolute pyridine is left for 48 hours at room temperature, and thereupon heated for 90 min. to a temperature of 80–85° C. It is then concentrated at reduced pressure to about one half the volume, 5 ml. water are added to the residue, and the mixture left standing for an additional 1 hour. Then it is diluted by addition of 200 ml. water and extracted by shaking with chloroform. The organic solution thus obtained is washed with 2 N HCl, 8% sodium bicarbonate solution and saturated salt solution, dried with sodium sulfate and evaporated. There is obtained 6.5 g. of foamy residue, which on being poured with ether with a little methanol crystallizes. By suction filtration 4.0 g. of a crude crystalline product is isolated, which is chromatographed on 95 g. neutral alumina (3% water). The desired trimethoxybenzoic ester (X) is washed with chloroform (3.0 g.), and for the analysis recrystallized from methanol-ether, M.P. 230–232° C. The analysis indicates that there is the question of a crystalline adduct with a half molecule of methanol. By continued elution of the column with chloroform containing 5% methanol 0.9 g. of the starting hydroxylactam (IX) are recovered.

The mixture of 2.8 g. of the above ester (X) and 30 ml. phosphorus oxychloride is boiled for 2 hours under reflux in nitrogen atmosphere. It is then evaporated at reduced pressure, the residue dissolved in 25 ml. of 90% methanol, and the solution mixed with 150 ml. of sodium perchlorate solution, prepared by neutralizing 14 ml. of 70% perchloric acid with sodium hydroxide. A yellow perchlorate (XI) is immediately eliminated and is sucked off after standing overnight. The product obtained, having after drying, M.P. 178–180° C. (decomp.), is sufficiently pure for the subsequent treatment.

The entire quantity of perchlorate (XI) thus obtained is mixed with 60 ml. acetone, 30 ml. water, 3 ml. of 70% perchloric acid and 5 g. powdered zinc, and the mixture boiled under stirring for 25 min. under reflux. Zinc is sucked off and washed with acetone, the filtrate evaporated at reduced pressure, and the eliminated crude perchlorate of dihydro-bases is sucked off. The product is dissolved in a mixture of 40 ml. acetone and 20 ml. water, and the bases are liberated by excess aqueous ammonia; on evaporation of the mixture the bases remain in the form of faintly coloured crystalline residue (2.4 g.). The residue is dissolved in chloroform and chromatographed on 75 g. neutral alumina (3% water). There is first eluated by chloroform 0.4 g. of DL-17-desmethoxy-17α-ethyl-3-iso-reserpine, which is amorphous. The subsequent fractions of the eluate contain the desired DL-17-desmethoxy-17α-ethyl reserpine (I), which is crystalline, and is recrystallized for the analysis from 90% methanol with a little chloroform (1.1 g. of pure substance), M.P. 140–143° C.

What we claim is:

The compound 17-desmethoxy-17α-ethyl reserpine of the formula:

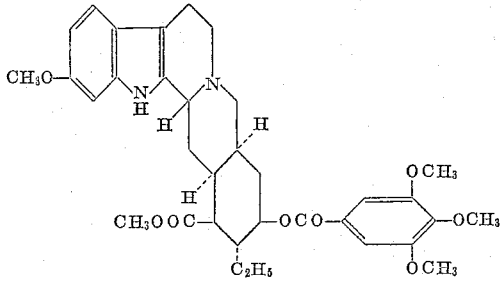

References Cited by the Examiner
UNITED STATES PATENTS

| | | | |
|---|---|---|---|
| 2,883,384 | 4/59 | Woodward | 260—287 |
| 2,933,500 | 4/60 | Rudner | 260—287 |
| 2,986,562 | 5/61 | Huebner | 260—287 |
| 2,990,407 | 6/61 | Velluz et al. | 260—287 |
| 3,042,707 | 7/61 | Joly et al. | 260—468 |

IRVING MARCUS, *Primary Examiner.*

NICHOLAS S. RIZZO, *Examiner.*